(12) United States Patent
Mueller et al.

(10) Patent No.: US 7,424,373 B2
(45) Date of Patent: Sep. 9, 2008

(54) DEVICE AND METHOD FOR DETERMINING AND/OR MONITORING A PROCESS VARIABLE OF A MEDIUM

(75) Inventors: Alexander Mueller, Susbach-Jechtingen (DE); Christoph Rompf, Greenwood, IN (US)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/544,867

(22) PCT Filed: Feb. 4, 2004

(86) PCT No.: PCT/EP2004/001040

§ 371 (c)(1),
(2), (4) Date: Jan. 30, 2006

(87) PCT Pub. No.: WO2004/070320

PCT Pub. Date: Aug. 19, 2004

(65) Prior Publication Data

US 2006/0142953 A1    Jun. 29, 2006

(30) Foreign Application Priority Data

Feb. 6, 2003   (DE) ............................. 103 04 968

(51) Int. Cl.
*G01N 31/00*   (2006.01)
(52) U.S. Cl. .................................................. 702/31
(58) Field of Classification Search ........... 702/31; 707/104.1; 340/539.1, 623
See application file for complete search history.

(56) References Cited

U.S. PATENT DOCUMENTS

| 5,511,553 | A | * | 4/1996 | Segalowitz ............... 600/508 |
| 5,585,786 | A | * | 12/1996 | Clark et al. ............... 340/623 |
| 6,822,565 | B2 | * | 11/2004 | Thomas et al. ........... 340/539.1 |
| 2004/0139110 | A1 | * | 7/2004 | LaMarca et al. ......... 707/104.1 |

FOREIGN PATENT DOCUMENTS

| DE | 3902767 | | 8/1990 |
| DE | 42 32 659 | A1 | 3/1994 |
| DE | 4412653 | | 5/1998 |
| DE | 199 33 812 | A1 | 2/2001 |
| DE | 19939535 | | 3/2001 |
| GB | 2 325 743 | A | 12/1998 |

* cited by examiner

*Primary Examiner*—Tung S. Lau
*Assistant Examiner*—Xiuquin Sun
(74) *Attorney, Agent, or Firm*—Bacon & Thomas, PLLC

(57) ABSTRACT

A device and a method for determining and/or monitoring a process variable of a medium. The device comprises a measuring unit which produces a first output signal, and a control/evaluation unit which further processes the first output signal of the measuring unit. A first task is assigned to the measuring unit; a second task is assigned to the control/evaluation unit; at least one, first task identification unit and at least one, second task identification unit are provided; a first coordination unit and a second co-ordination unit are provided, which are used to associate codings with the tasks; and a comparison unit is provided, with which the measuring unit and the control/evaluation unit are connected, and which compares the first coding with the second coding.

3 Claims, 2 Drawing Sheets

DEVICE AND METHOD FOR DETERMINING AND/OR MONITORING A PROCESS VARIABLE OF A MEDIUM

The invention relates to a device for determining and/or monitoring a chemical or physical process variable of a medium in a container. The device includes a measuring unit, which produces a first output signal, and a control/evaluation unit, which further processes the first output signal of the measuring unit. Additionally, the invention relates to a corresponding method. The process variables can be, for example, the fill level, density, viscosity, pressure, pH or temperature of the medium.

Fill level measuring devices, such as are available from Endress +Hauser, serve e.g. for monitoring that a predetermined limit level is not exceeded, or subceeded (fallen beneath). They serve, thus, as protection against overflow or running empty. In the first case, it must be prevented that a substance overflows and then, for instance, contaminates the environment. In the other case, an emptying of a container must be prevented, in order e.g. to prevent pumps from overheating, which can be dangerous, especially in the case of flammable substances. If very dangerous substances are involved, then the safety of the measuring devices—also known as limit level switches—must be increased still more. Thus, then it must e.g. also be assured continuously during the process that the measuring device is functioning as it should. To this end, the assignee provides a continuous self-checking, e.g. in the FailSafe concept of some devices.

A measuring system is composed usually of a measuring unit and a control/evaluation unit. In the case of the measuring unit, such can be a Liquiphant level limit switch, a product available from the assignee. Such Liquiphant level limit switch involves introducing a tuning fork into the container, where the medium is located. The fork is then excited to oscillate. The frequency and amplitude of the oscillations depend on whether the fork is oscillating in air or in the medium. In the medium, the damping of the oscillation is increased, so that amplitude and frequency decrease. Since the fork is mounted at a well-defined location, a frequency change then indicates that a fill level of the medium has been reached. Usually, the frequency and not the amplitude is evaluated. In the case of overfilling protection, this would mean that the fork first oscillates in air and that covering by the medium decreases the frequency. Consequently, the transition to a lower oscillation frequency is a sign that the fill level has been reached. If the measuring unit is used for protection against running empty, in turn an increasing of the frequency is a sign that the fill level has been subceeded, or fallen beneath, since the oscillation frequency of the freed tuning fork is higher than in the covered state.

The measuring unit transfers its measurement data usually to the control/evaluation unit, which either directly, e.g. by the closing of a valve, triggers an action or an alarm, or a suitable alarm signal is produced from the measurement data and this alarm signal is transferred e.g. onto a suitable bus system. Along with the measurement data, data can also be transferred from the measuring unit concerning e.g. the resonance frequency of the oscillatable unit of the measurement unit. This is e.g. used so that, in the case of a replacement of the oscillatable unit, the control/evaluation unit does not also have to be replaced or re-programmed, because the oscillation frequency of the measuring unit in air, which e.g. serves as reference point, is different (see, in this connection German Patentschrift DE 42 32 659).

A prerequisite for effective and correct monitoring of fill level is that the measuring unit and the control/evaluation unit perform the same measuring task. For instance, if the measuring unit is responsible for overfill protection, then, upon the reaching of the fill level, it will e.g. report its oscillation frequency in air and its instantaneous oscillation frequency to the control/evaluation unit. The oscillation frequency is, because of the covering, lower than for the case of oscillation in air, and, consequently, the measuring unit reacts to this lower frequency. If, however, the control/evaluation unit is set for running-empty protection, then it would deduce from these two frequencies that the oscillatable unit of the measuring unit is covered by medium, because the oscillation frequency is smaller than in air. Therefore, the control/evaluation unit, which is fulfilling the task of running-empty protection, would not react. This would lead then to an overflow, with associated dangers for people and environment. It can also be imagined, that the measuring unit, in the case of overflow protection, reacts appropriately with a report. The control/evaluation, in the case of running-empty protection, could react to such a report, which would be interpreted by the control/evaluation unit as a subceeding, or falling beneath, of the fill level, e.g. with the opening of a supply valve, which would be fatal, since the maximum fill level was already reached.

It is, therefore, an object of the invention to provide a device and a method for assuring that the measuring unit and the control/evaluation unit are performing the same safety, protection or measurement task.

The object is achieved by the device of the invention by providing that a first task is assigned to the measuring unit, that a second task is assigned to the control/evaluation unit, that at least one, first task identification unit and at least one, second task identification unit are provided, with the first task identification unit recognizing the task of the measuring unit and the second task identification unit recognizing the task of the control/evaluation unit, that a first coordination unit and a second coordination unit are provided, with a first coding being associated via the first coordination unit with the first task of the measuring unit, and with a second coding being associated via the second coordination unit with the second task of the control/evaluation unit, that a comparison unit is provided, with which the measuring unit and the control/evaluation unit are connected, and which compares the first coding with the second coding.

The measuring unit and the control/evaluation unit thus receive separately their respective tasks. This separation has e.g. the advantage that both units can be separately replaced. A coding is associated with each task. The type of coding depends, in such case, also on the transmission protocol between the units and the comparison unit. The matching of a task to a coding is, in such case, stored in corresponding coordination units. The coordination units are suitably dimensioned, depending on the number of tasks. For instance, if the tasks of concern are overflow protection or running-empty protection, then, for instance, a toggle switch can be used, which switches between two different codings. A comparison unit then compares the two codings; that is, by the codings, the tasks are transmitted in a format which can be suitably evaluated. On the other hand, however, through the coding, it is compelled that only units can communicate with one another, which can use such a coding, i.e. which are connected using this special measure of safety. At the same time, by the use of different and, therefore, incompatible matchings between task and coding, it is assured that e.g. different device generations can not communicate with one another. The task assignment can e.g. occur via the connection wiring. Another option, however, is also DIP-switches, which, it is true, are clearly easier to re-configure, but, therefore however, are burdened with a greater risk.

In an advantageous embodiment, at least one coding unit is provided, which encodes the first output signal of the measuring unit according to the first coding. Via the coding of the output signal, the coding thus becomes transferable to the comparison unit. In such case, the actual measurement signals can be suitably encoded, or supplemental signals can be produced, whose only job is to carry the coding.

An advantageous embodiment provides that the control/evaluation unit produces a second output signal, and that at least one coding unit is provided, which encodes the second output signal of the control/evaluation unit in accordance with the second coding. Also here, the coding is thus superimposed on suitable output signals. These output signals are provided only for the reporting of the coding. The control/evaluation unit can, it is true, also produce other output signals, which e.g. carry to a control station the order for actions or an alarm, but these are possible only following the processing of the output signals of the measuring unit, and, for this processing to begin, it is first necessary to ascertain whether the output signals of the measuring unit are allowed to be processed.

An advantageous embodiment provides that the comparison unit is embodied such that it compares the coding of the first or second output signal with the second or first coding. A further embodiment provides that the comparison unit is embodied such that it compares the coding of the first output signal with the coding of the second output signal. In the comparison unit, thus either the codings are directly compared, with it being left to the technical implementation, how the coding reaches the comparison unit from the measuring and control/evaluation units. Then there is still the possibility that at least from one unit, the coding is transmitted via the corresponding output signal. And, finally, the codings of the output signals are directly compared with one another. This variant would thus mean that e.g. the measuring unit transfers the measurement data encoded to the comparison unit. Reaching such destination are also the encoded output signals of the control/evaluation unit. Then, the two signals are compared with regard to the coding. In the case that the codings are identical, the output signal of the measuring unit reaches the control/evaluation unit via the comparison unit and can be additionally processed there or e.g. transmitted on a bus system. For the comparison, it is not necessary for the comparison unit to know which task is connected with which coding. Of concern, only. is that the measuring unit and the control/evaluation unit have the same coding and are, therefore, charged with the same task.

An advantageous embodiment provides that the control/evaluation unit is embodied in a manner such that it only processes the first output signal in the case in which the two codings are identical. In other cases, means can be provided for the output of an error report, or the measuring unit and/or the control/evaluation unit are blocked. The entire plant could even be locked.

An advantageous embodiment includes that the encoded first and second output signals are frequency-modulated, current signals. This is advantageous e.g. in the case of two-wire technology. The reaching of a fill level e.g. in the 4 ... 20 mA signalizing is indicated by a predetermined signal level. Then the frequency modulation can be applied to these current signals.

The object is achieved according to the method of the invention by the steps of performing a first task by the measuring unit, providing a first coding for the first task of the measuring unit, performing a second task by the control/evaluation unit, associating a second coding with the second task of the control/evaluation unit, comparing the first and second codings, and further processing the first output signal of the measuring unit by the control/evaluation unit only in the case in which the first and second codings are identical. Thus, a coding is associated with each task and, by comparing the codings, it can be determined whether the tasks are the same. Only in the case of identical codings are the output signals of the measuring unit processed further.

In an advantageous embodiment, it is provided that the first output signal of the measuring unit is encoded with the first coding. In this way, the coding can be transmitted. In such case, the output signals for the coding can be the actual measurement data or special signals.

A further embodiment provides that the control/evaluation unit produces a second output signal, which is encoded with the second coding. Thus, the principle used for communicating the coding of the measuring unit is used here also in the case of the control/evaluation unit, however with the difference that, here, special signals must be used.

In conjunction with this, there is also a useful embodiment, which includes that the coding of the first or second output signal is compared with the second or first coding. A further embodiment includes that the coding of the first output signal is compared with the coding of the second output signal. Thus, the important codings are brought back out of the signals, in order to be able to compare them.

BRIEF DESCRIPTION OF THE DRAWINGS

The invention will now be explained in greater detail on the basis of the drawings, the figures of which show as follows.

DESCRIPTION OF THE PREFERRED EMBODIMENT

Figure 1:
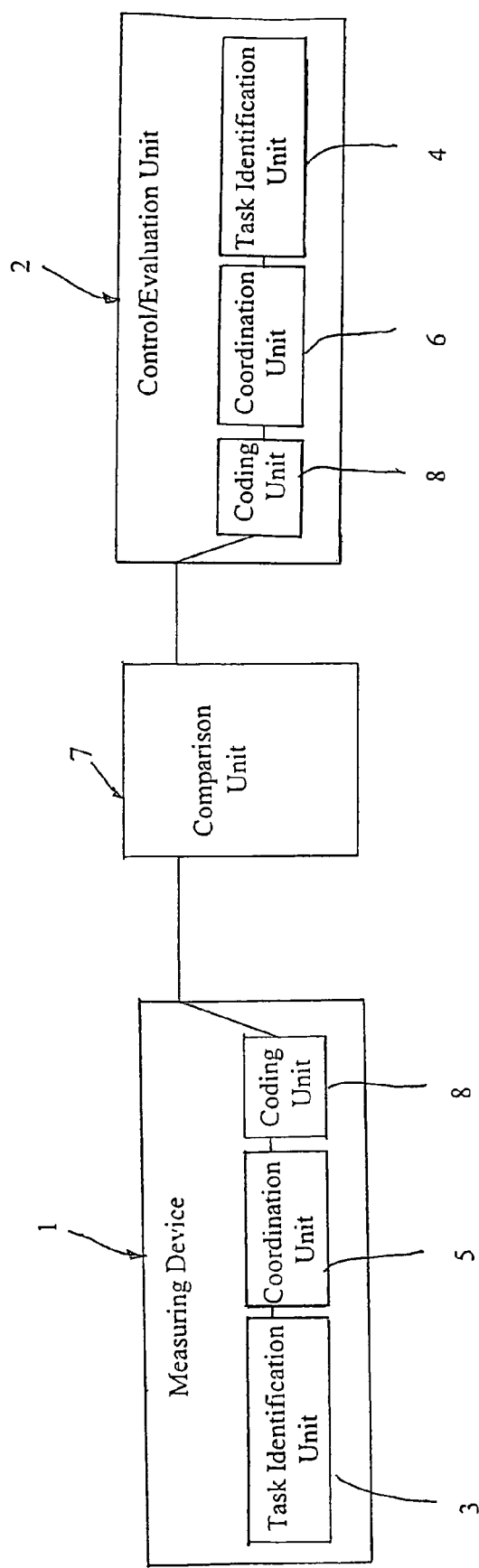
FIG. 1 a block diagram of the device.

FIG. 1 shows a block diagram of the device. In the illustrated example, some components of the invention are already integrated into the devices. The measuring device 1 additionally includes a task identification unit 3, a coordination unit 5 and a coding unit 8. For example, via the connection wiring, a task, e.g. overfill protection, is assigned to the measuring unit. This task is recognized by the task identification unit 3 and a corresponding query/order is issued to the coordination unit. Located there are the matchings of the tasks to the codings. With the appropriate coding, the coding unit 8 then becomes active, for encoding the output signals of the measuring unit 1 with this coding. In this way, the output signals of the measuring unit 1 then carry the information on which task the measuring unit 1 has to perform. Through this information, it is also reported, how the output signals are to be interpreted. The task identification unit 3, the coordination unit 5 and the coding unit 8 can e.g. be integrated in a single microprocessor.

The control/evaluation unit 2 includes the task identification unit 4, the coordination unit 6 and a coding unit 8. In this case, thus, the control/evaluation unit 2 likewise produces a second output signal. The output signals of the measuring unit 1 and the control/evaluation unit 2 are both fed to the comparison unit. This compares the two codings with one another. If they are identical, then the control/evaluation unit 2 can process the output signals of the measuring unit. If the codings are different, then a warning signal can be issued or the plant stopped or the control/evaluation unit 2 locked. Further options are thinkable and should match the demands of the given situations. If the measuring unit 1 and the control/evaluation unit 2 use different tables for the translation of a task into a coding, then the contact does not function. In a further embodiment, the comparison unit 7 can also be a part of the measuring unit 1 or the control/evaluation unit 2. In this way, the coding of the output signals of that unit would then not have to be done, since the coding would, in such case, be transferred directly into the comparison unit 7.

Figure 2:
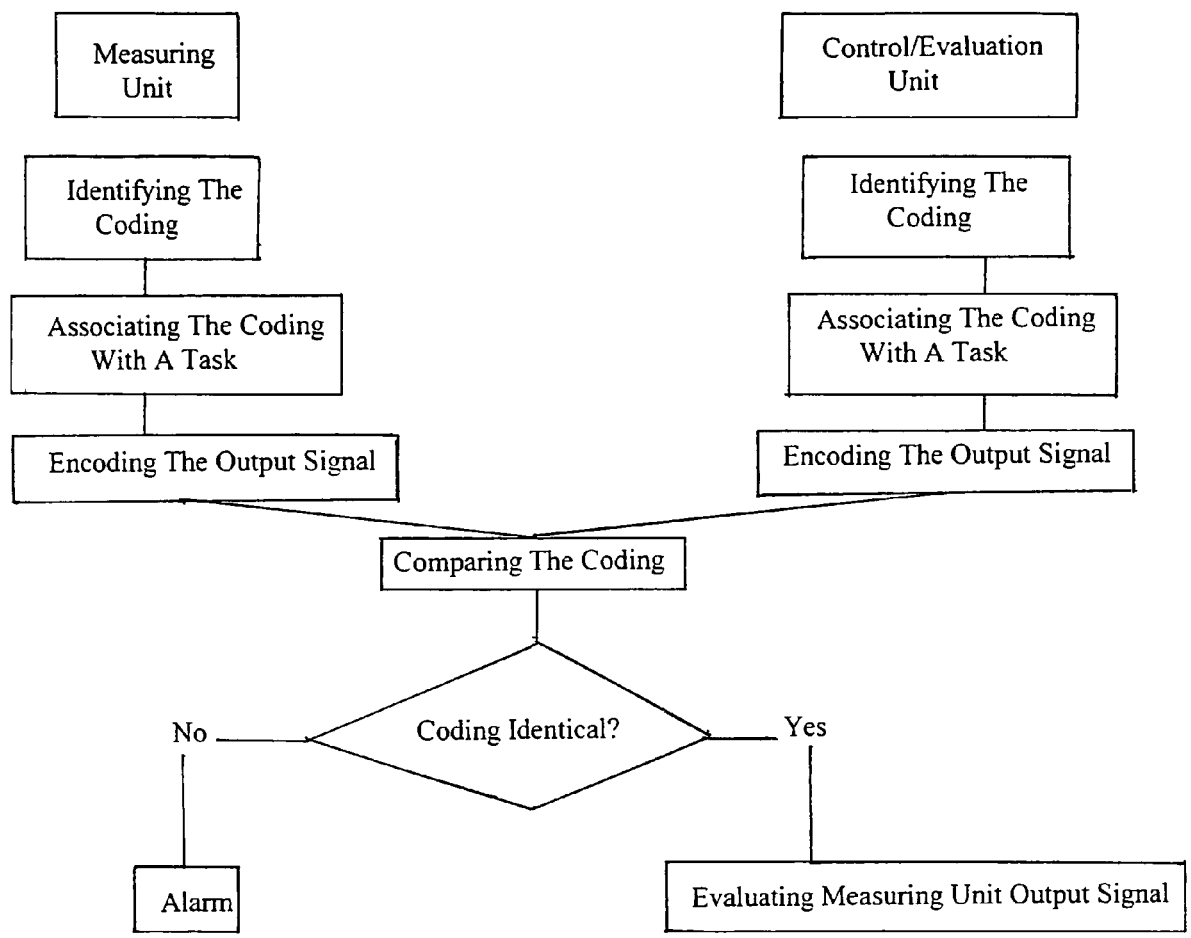
FIG. 2 a flow diagram of the method.

FIG. 2 shows a flow diagram of the method of the invention. In both the measuring unit and in the control/evaluation unit, initially, the same steps transpire as follows: the task is identified, a matching coding is determined, and the output signals are encoded with this coding. Following this, the two codings are compared. If they are identical, then the control/evaluation unit can process the first output signal of the measuring unit. If the codings differ, then e.g. an alarm is triggered.

The invention claimed is:

1. A device for determining and/or monitoring the fill level of a medium in a container, comprising:
   - a measuring unit, which comprises an oscillatable unit and which produces a first output signal, said first output signal being a measurement signal of said measuring unit;
   - means for assigning a first task to said measuring unit, said first task implies how the first output signal is to be interpreted, said first task being either overflow protection or running-empty protection;
   - at least one coding unit which encodes said first output signal of said measuring unit in correspondence with a first coding which is associated with said first task of said measuring unit;
   - a control/evaluation unit, which produces a second output signal, and which further processes the first output signal of said measuring unit;
   - at least one further coding unit which encodes said second output signal in correspondence with said second coding; and
   - means for assigning a second task to said control/evaluation unit, wherein:
   - said second task implies how the control/evaluation unit interprets said first output signal of said measuring unit, said second task being either overflow protection or running-empty protection;
   - said control/evaluation unit is embodied in a manner such that it further processes said first output signal only in the case in which said first task and said second task are identical;
   - at least one, first task-identification unit; and
   - at least one, second task-identification unit;
   - said first task-identification unit identifies the task of said measuring unit, and
   - said second task-identification unit identifies the task of said control/evaluation unit;
   - a first coordination unit;
   - a second coordination unit; and
   - a comparison unit, with which said measuring unit and said control/evaluation unit are connected, wherein:
   - via said first coordination unit, said first coding is associated with the first task of said measuring unit;
   - via said second coordination unit, said second coding is associated with the second task of said control/evaluation unit; and
   - said comparison unit compares the first coding with the second coding and if said first coding and said second coding are different then said control/evaluating unit is blocked.

2. The device as claimed in claim 1, wherein:
   said comparison unit is embodied in a manner such that it compares the coding of the first output signal with the coding of the second output signal.

3. The device as claimed in claim 1, wherein: the encoded first output signal and the encoded second output signal are frequency-modulated, current signals.

* * * * *